UNITED STATES PATENT OFFICE 2,233,940

DIOXAZINES AND PROCESS OF MAKING THE SAME

Willy Burneleit, Cologne-Deutz, Germany, assignor to General Aniline & Film Corporation, a corporation of Delaware No Drawing. Application December 10, 1938, Serial No. 245,039. In Germany December 10, 1937

14 Claims. (Cl. 260—246)

The present invention relates to a new process of making dioxazines and to the new products obtainable thereby.

One object of my present invention resides in the development of a new process which can be applied generally to the preparation of dioxazines. Another feature of my invention is the preparation of new dioxazines which are valuable as dyestuffs as such or after sulfonation. Other objects of my invention will be apparent from the following description and claims.

I have found that dioxazines are obtained by causing aromatic diamines of the general formula $H_2N-A-NH_2$ wherein A is an arylene group capable of assuming a quinoid structure, o-diamines, however, being excluded, to react upon o-quinones. The reaction proceeds according to the following equation (p-phenylene-diamine and phenanthrene quinone being chosen as example):

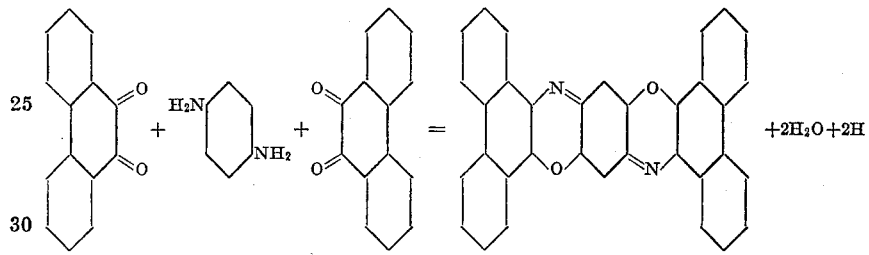

As can be seen from this equation at least one o-position with respect to each amino group must be unsubstituted or is permitted to be substituted only by a substituent being easily replaceable. Such substituents are, for instance, halogens. It is to be pointed out, that the formula of the reaction product, given in the above equation, is only a probable one as regards the linkage of the oxygen atoms with the benzene nucleus.

As o-quinones suited for my reaction there may be mentioned, for instance, o-quinones of the naphthalene, phenanthrene, anthracene, chrysene, and pyrene series. Other o-quinones, however, are not to be excluded. As aromatic diamines of the character stated above there may be used such as are derived from the benzene, naphthalene, anthracene, phenanthrene, pyrene, fluorene, carbazol or chrysene series, as, for instance, p-phenylene-diamine, 2.6-naphthylene-diamine, benzidine and 3.8- and 3.10-diaminopyrene. The starting materials may also be substituted by other substituents, such as halogen or alkyl and alkoxy groups.

The reaction is preferably carried out in the presence of an organic solvent as, for instance, nitrobenzene, acetic acid, phenol, or in a mixture of those at an elevated temperature. The reaction may be catalytically accelerated by the addition of a suitable catalyst, for instance iodine, boric acid, or an aromatic sulfochloride, for instance p-toluene-sulfochloride. The dioxazines obtained precipitate from the reaction mixture in a crystalline state. They may be separated in a usual manner, for instance with suction, if necessary at an elevated temperature and further purified by boiling out with an organic solvent.

The products thus obtained correspond to the following general formula

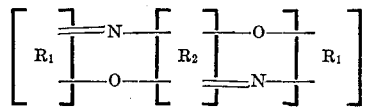

wherein $R_1$ represents arylene groups and $R_2$ represents an aromatic carbocyclic group. As I am aware of the fact that some representatives of that class of compounds in which $R_2$ in the above formula represents a group of the benzene series are known, I confine myself to claim as new products only such compounds as correspond to the above formula in which $R_2$ is an at least bicyclic aromatic carbocyclic group.

The products which are obtainable in accordance with my new process may be applied as such as pigment dyestuffs or as sulfonation products for dyeing of wool and cotton. The sulfonation may be carried out in the usual manner by treating the products with concentrated sulfuric acid or oleum.

The following examples illustrate the invention without, however, restricting it thereto, the parts being by weight:

*Example 1*

5.4 parts of p-phenylenediamine, 20 parts of phenanthrene quinone and 100 parts of nitrobenzene are heated to boiling for 2 hours. The reaction product separates in large dark crystals.

It is filtered with suction at a temperature of about 100°. It dissolves in an excess of boiling nitrobenzene or quinoline with blue-violet coloration and crystallizes in needles or prisms. It dissolves in concentrated sulfuric acid with a green color. The sulfonation product dyes wool and cotton blue-violet.

*Example 2*

21 parts of phenanthrene quinone, 8.8 parts of 2.5-dichloro-1.4-phenylenediamine and 60 parts of nitrobenzene are heated to boiling for 3 hours while stirring. The reaction mixture changes its color in a short time to violet and after half an hour the precipitation of violet crystals occurs. The reaction product is filtered with suction at a temperature of about 100°. It dissolves in boiling nitrobenzene with a violet, in concentrated sulfuric acid with a green color.

*Example 3*

8 parts of 2.6-naphthylenediamine, 32 parts of phenanthrene quinone and 200 parts of glacial acetic acid are heated to boiling for 4 hours while stirring. Then the precipitate is filtered with suction in the heat and boiled out with nitrobenzene, a crystallized product remaining undissolved. It represents dark-red crystals which dissolve in an excess of nitrobenzene or quinoline with a blue-green color. The product dissolves in concentrated sulfuric acid with an olive-green color. The sulfonation product dyes cotton green.

*Example 4*

9 parts of benzidine, 32 parts of phenanthrene quinone and 200 parts of glacial acetic acid are heated to boiling for 14 hours. The dark precipitate is filtered with suction and boiled out with nitrobenzene for several times. A product is obtained which dissolves in an excess of quinoline with a yellow-green color and crystallizes in little prisms. In concentrated sulfuric acid the product dissolves at first with a green color which changes to violet after some time.

*Example 5*

25 parts of chrysene quinone and 100 parts of nitrobenzene are heated to boiling while stirring. Then 0.5 part of iodine are added and subsequently 5 parts of p-phenylenediamine are slowly introduced and heated to boiling for 2 hours. The reaction product is filtered with suction at a temperature of 100° and rinsed with hot nitrobenzene. Dark needles are obtained which dissolve in much boiling nitrobenzene with a blue color. In concentrated sulfuric acid the product dissolves, when slowly warmed, with a green color. The sulfonation product dyes cotton strong beautiful blue shades.

*Example 6*

26 parts of chrysene quinone, 5.3 parts of 2.6-naphthylenediamine and 100 parts of glacial acetic acid are heated to boiling for 1 hour while stirring. The precipitate is filtered off, triturated with glacial acetic acid and filtered with suction. Then the reaction product is boiled out with nitrobenzene for two times. A green crystallized product is obtained which is practically insoluble in organic solvents. In concentrated sulfuric acid it dissolves, when slightly warmed, with a green color.

*Example 7*

26 parts of N-methyl-1.2-benzocarbazol-3.4-quinone (obtained by methylation of the corresponding benzocarbazol quinone with p-toluenesulfonic acid methyl ester and potassium carbonate in boiling nitrobenzene. Preparation of the benzocarbazol quinone (see application Ser. No. 176,623 to Willy Burneleit) are heated to boiling with 120 parts of nitrobenzene while stirring. Then successively 0.5 part of iodine and 5.4 parts of p-phenylenediamine are added. The color of the solution changes to green and after a short time the precipitation of thin dark needles occurs. The reaction product is filtered with suction after one hour at a temperature of about 100°. It dissolves in boiling nitrobenzene with a greenish blue and in concentrated sulfuric acid with a green color.

*Example 8*

30 parts of chrysene quinone, 8 parts of 2.6-naphthylenediamine, 60 parts of phenol and 10 parts of nitrobenzene are heated to boiling for 3 hours while stirring. The product separates in large dark crystals. It is filtered with suction at a temperature of about 100° and boiled out with nitrobenzene. It is identical with that obtainable according to Example 6.

*Example 9*

5.8 parts of 3.8-diaminopyrene, 15.6 parts of phenanthrene quinone, 60 parts of phenol and 60 parts of nitrobenzene are heated to boiling for 3 hours while stirring. The reaction product separates in dark crystals. It is filtered with suction at a temperature of about 100° and boiled out with nitrobenzene. In organic solvents it is practically insoluble. In concentrated sulfuric acid it dissolves, when slightly warmed, with a green color.

*Example 10*

500 parts of nitrobenzene are distilled in an anhydrous state, then thereto are added 38 parts of 8-benzoylamino-1.2-chrysene quinone, 12 parts of p-phenylenediamine and subsequently 8 parts of p-toluenesulfo chloride at a temperature of about 200°. When the reaction is finished the product is heated to boiling for a short time and then cooled. It is filtered with suction at 130° and washed with nitrobenzene and alcohol. The condensation product obtained in grey-violet needles is soluble in concentrated sulfuric acid with a brown color. The sulfonation product obtainable by treating it with concentrated sulfuric acid or oleum dyes the vegetable and artificial fiber clear blue-green to green shades.

I claim:

1. The process which comprises causing aromatic diamines of the general formula

H₂N—A—NH₂ wherein A is an arylene group capable of assuming a quinoid structure, o-diamines, however, being excluded, to react upon o-quinones.

2. The process which comprises causing aromatic diamines of the general formula

H₂N—A—NH₂ wherein A is an arylene group capable of assuming a quinoid structure, o-diamines, however, being excluded, to react upon o-quinones in the presence of an organic solvent.

3. The process which comprises causing aromatic diamines of the general formula

H₂N—A—NH₂ wherein A is an arylene group capable of assuming a quinoid structure, o-diamines, however, being excluded, to react upon o-quinones in the presence of an organic solvent and a catalyst.

4. The process which comprises causing aromatic diamines of the general formula $$H_2N—A—NH_2$$

wherein A is an arylene group capable of assuming a quinoid structure, o-diamines, however, being excluded, to react upon o-quinones in the presence of an organic solvent and iodine as a catalyst.

5. The process which comprises causing aromatic diamines of the general formula $$H_2N—A—NH_2$$

wherein A is an arylene group capable of assuming a quinoid structure, o-diamines, however, being excluded, to react upon o-quinones in the presence of nitrobenzene as an organic solvent and iodine as a catalyst.

6. The process which comprises causing aromatic diamines of the general formula $$H_2N—A—NH_2$$

wherein A is an arylene group capable of assuming a quinoid structure, o-diamines, however, being excluded, to react upon o-quinones and subjecting the reaction products obtained to a sulfonation process.

7. A process which comprises causing 2.6-naphthylene-diamine to react upon an o-quinone.

8. A process which comprises causing 2.6-naphthylene-diamine to react upon an o-quinone in the presence of an organic solvent and a catalyst.

9. A process which comprises causing 2.6-naphthylene-diamine to react upon an o-quinone in the presence of an organic solvent and subjecting the reaction products obtained to a sulfonation process.

10. The process which comprises causing 2.6-naphthylene-diamine to react upon phenanthrene quinone.

11. The process which comprises causing 2.6-naphthylene-diamine to react upon phenanthrene quinone in the presence of an organic solvent.

12. The process which comprises causing 2.6-naphthylene-diamine to react upon phenanthrene quinone in the presence of an organic solvent and subjecting the reaction product obtained to a sulfonation process.

13. The products obtained by heating 2.6-naphthalene-diamines with o-quinones being free from secondary and tertiary amino groups, the said compounds having the probable formula

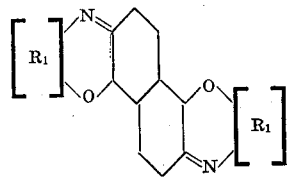

wherein $R_1$ represents an arylene radical.

14. The product obtained by heating 2.6-naphthalene-diamines with phenanthrene-quinone, the said compound having the probable formula

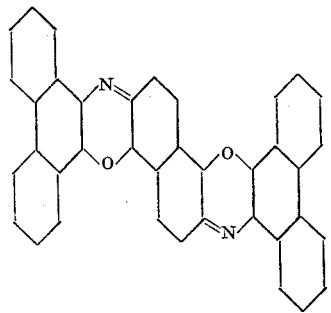

WILLY BURNELEIT.